(12) United States Patent
Jung et al.

(10) Patent No.: US 8,948,128 B2
(45) Date of Patent: Feb. 3, 2015

(54) METHOD AND APPARATUS FOR HANDOVER BY CHANGING ZONES IN A WIRELESS COMMUNICATION SYSTEM

(75) Inventors: In Uk Jung, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 317 days.

(21) Appl. No.: 13/202,323

(22) PCT Filed: Feb. 19, 2010

(86) PCT No.: PCT/KR2010/001032
§ 371 (c)(1),
(2), (4) Date: Oct. 28, 2011

(87) PCT Pub. No.: WO2010/095880
PCT Pub. Date: Aug. 26, 2010

(65) Prior Publication Data
US 2012/0140733 A1    Jun. 7, 2012

Related U.S. Application Data

(60) Provisional application No. 61/153,945, filed on Feb. 19, 2009.

(51) Int. Cl.
*H04W 36/16* (2009.01)
*H04W 36/00* (2009.01)

(52) U.S. Cl.
CPC ...... *H04W 36/0077* (2013.01); *H04W 36/0066* (2013.01); *H04W 36/0072* (2013.01)
USPC ......................................... 370/331

(58) Field of Classification Search
CPC ............. H04W 36/14; H04W 36/16; H04W 36/0055–36/0088
USPC .................. 370/329–311; 455/436
See application file for complete search history.

(56) References Cited

U.S. PATENT DOCUMENTS

2005/0277417 A1* 12/2005 Yoon et al. .................. 455/436
2008/0090585 A1*  4/2008 Hart et al. ................... 455/453
(Continued)

FOREIGN PATENT DOCUMENTS

| KR | 20050088817 | 9/2005 |
| KR | 20070078450 | 8/2007 |
| WO | 2007/004847 | 1/2007 |

OTHER PUBLICATIONS

Chou et al., "Comment on the SDD Text on 16e/16m Handover on Zone Switch Operation", IEEE C802.16m-09/0145, published on Jan. 5, 2009.*

(Continued)

*Primary Examiner* — Khaled Kassim
*Assistant Examiner* — Zhaohui Yang
(74) *Attorney, Agent, or Firm* — Lee, Hong, Degerman, Kang & Waimey

(57) ABSTRACT

A method for a terminal to perform a handover including transmitting a ranging request message, containing a field requesting a zone change from a first type of terminal support zone to a second type of terminal support zone of the second type of target base station, to the second type of target base station via the first type of terminal support zone; receiving a ranging response message, containing a field indicating the omission of a capability negotiation message in the event of network reentry, from the second type of target base station via the first type of terminal support zone; and transmitting a second type of capability request message to the second type of target base station via the second type of terminal support zone.

17 Claims, 6 Drawing Sheets

(56) References Cited

U.S. PATENT DOCUMENTS

| | | | |
|---|---|---|---|
| 2008/0101314 A1* | 5/2008 | Bachmutsky | 370/342 |
| 2008/0232330 A1* | 9/2008 | Lee et al. | 370/335 |
| 2009/0186594 A1* | 7/2009 | Kang et al. | 455/404.1 |
| 2010/0105378 A1* | 4/2010 | Shi et al. | 455/432.1 |
| 2011/0164592 A1* | 7/2011 | Liu et al. | 370/331 |

OTHER PUBLICATIONS

Thakare et al., "Initial Capability Negotiation Procedure for IEEE 802.16m", IEEE C802.16m-08/1167, published Sep. 5, 2008.*

Hamiti et al., "IEEE 802.16m System Description Document", IEEE 802.16m-08/003r4 (hereinafter 80.216m SDD), published on Jul. 29, 2008.*

Kim et al., Design Considerations for Bandwidth Request Header in IEEE 802.16m Systems, IEEE C802.16m-08/1286r1, published on Oct. 31, 2008.*

IEEE Std 802.16e™—2005, "Part 16: Air Interface for Fixed and Mobile Broadband Wireless Access Systems Amendment 2: Physical and Medium Access Control Layers for Combined Fixed and Mobile Operation in Licensed Bands", excerpt cover, TOC, LOF, p. 679-683, published Feb. 28, 2006.*

* cited by examiner

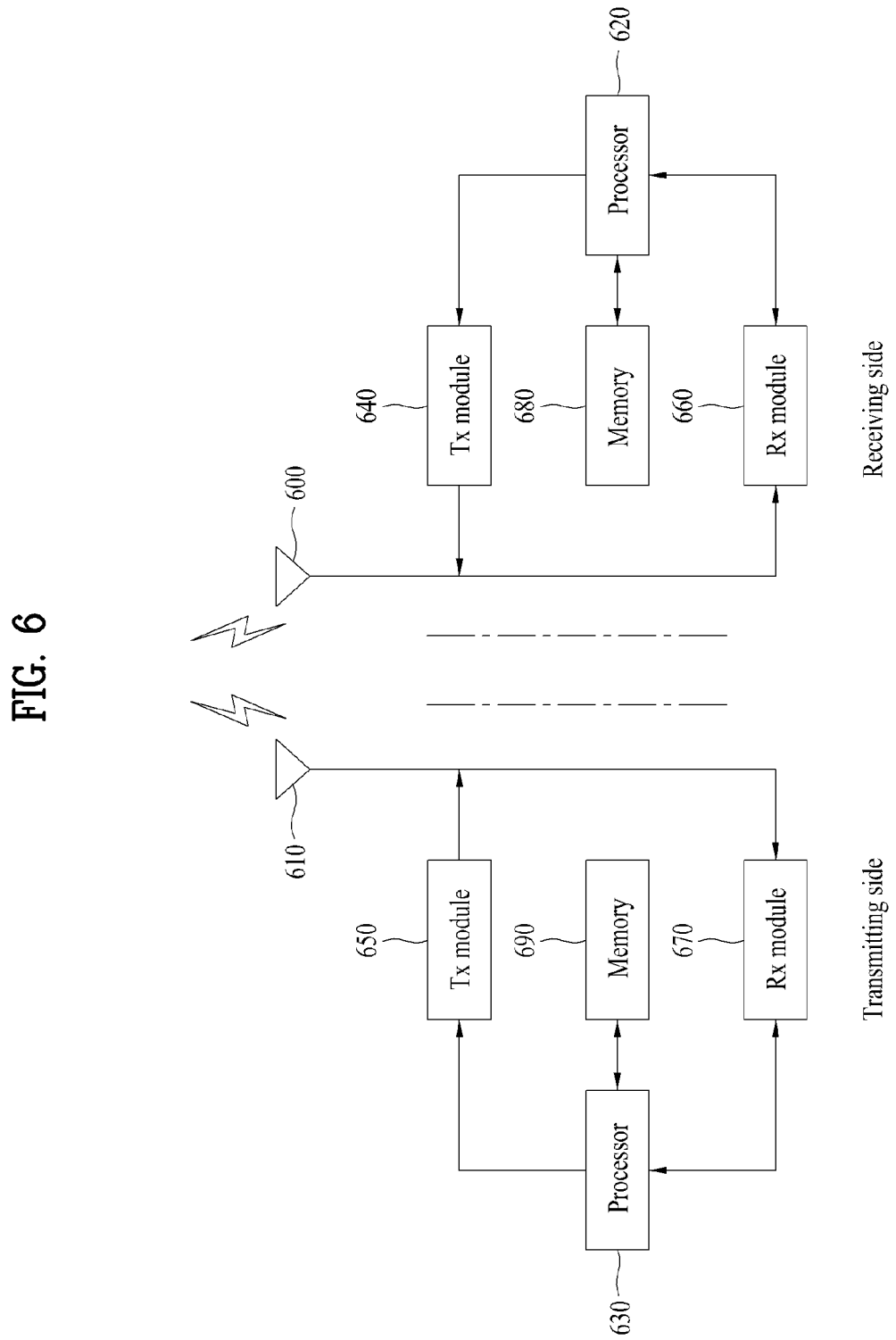

METHOD AND APPARATUS FOR HANDOVER BY CHANGING ZONES IN A WIRELESS COMMUNICATION SYSTEM

This application is the National Stage filing under 35 U.S.C. 371 of International Application No. PCT/KR2010/001032, filed on Feb. 19, 2010, which claims the benefit of U.S. provisional application Ser. No. 61/153,945, filed on Feb. 19, 2009.

TECHNICAL FIELD

The following description relates to a wireless communication system, and more particularly, to a method and apparatus for performing handover through zone switching.

BACKGROUND ART

Handover (HO) indicates that a mobile station (MS) moves from an air interface of one base station to an air interface of another base station. Hereinafter, a handover procedure of a general IEEE 802.16e system will be described.

In an IEEE 802.16e network, a serving base station (SBS) may broadcast neighboring base station information through a neighboring advertisement (MOB_NBR-ADV) message in order to inform a mobile station (MS) of information (topology) about a basic network configuration.

The MOB_NBR-ADV message includes system information of a serving base station and neighboring base stations, for example, preamble indexes, frequencies, HO optimization degrees, downlink channel descriptor (DCD)/uplink channel descriptor (UCD) information, etc.

DCD/UCD information includes information necessary to enable an MS to perform information exchange in downlink and uplink. For example, DCD/UCD information includes HO trigger information, information about a medium access control (MAC) version of a base station, media independent handover capability information, etc.

A general MOB_NBR-ADV message includes only information about neighboring base stations of an IEEE 802.16e type. Information about base stations of the type other than an IEEE 802.16e type may be broadcast to MSs through a service identity information advertisement (SII-ADV) message. Accordingly, an MS may request an SBS to transmit the SII-ADV message so as to acquire information about base stations of a heterogeneous network.

A procedure for performing handover by an MS, which acquires information about neighboring base stations using the above-described method, in an IEEE 802.16e network will be described in greater detail.

The general procedure of performing handover in an IEEE 802.16e network may include HO initiation and preparation, HO execution and HO completion.

An example of a basic handover procedure having the above configuration will be described with reference to FIG. 1.

FIG. 1 is a diagram showing an example of a handover procedure which may be performed in an IEEE 802.16e system.

Referring to FIG. 1, first, a mobile station (MS) may access a serving base station (SBS) so as to perform data exchange (S101).

The SBS may periodically broadcast information about neighboring base stations (BSs) located within a coverage area thereof to the MS through an MOB_NBR-ADV message (S102).

The MS may begin to scan candidate HO BSs using an HO trigger condition while communicating with the SBS. The MS may transmit a handover request (MSHO-REQ) message so as to request the SBS to perform a handover procedure if a handover condition exceeds, for example, a predetermined hysteresis margin value (S103).

The SBS which receives the handover request may inform candidate HO BSs included in the MSHO-REQ message of the handover request from the MS through an HO-REQ message (S104).

The candidate HO BSs may take precautions for the MS which requests handover and transmit information associated with handover to the SBS through an HO-RSP message (S105).

The SBS may transmit information associated with handover acquired from the candidate HO BSs through the HO-RSP message to the MS through a handover response (BSHO-RSP) message. The BSHO-RSP message may include information for performing handover, such as an action time for performing handover, a handover identifier HO-ID and a dedicated HO CDMA ranging code (S106).

The MS may determine one target BS among the candidate HO BSs based on information included in the BSHO-RSP message received from the SBS. Then, the MS may attempt to perform initial ranging for transmitting a ranging request (RNG-REQ) message to the determined target BS using a CDMA code (S107).

The target BS which receives the CDMA code may transmit information as to whether or not ranging succeeds and physical correction values to the MS through a ranging response (RNG-RSP) message (S108).

If correction is not necessary, the MS may transmit a ranging request (RNG-REQ) message for authentication to the target BS (S109).

The target BS which receives the ranging request message of the MS may provide system information available to the BS, such as a connection identifier (CID), to the MS through a ranging response message (S110).

If the target BS successfully completes authentication of the MS and sends all update information, the target BS may inform the previous SBS of the MS of information indicating whether or not handover succeeds through a handover completion (HO-CMPT) message (S111).

Thereafter, the MS may exchange information with the target BS which performs handover (S112).

The above-described handover process is performed between the MS and the BS which follow the IEEE 802.16e standard (WirelessMAN-OFDMA Reference System). Hereinafter, in the present specification, for convenience, a system to which a general technology including the IEEE 802.16e standard is applied is referred to as a "legacy system" or a "first type system". An MS to which the legacy technology is applied is referred to as an "YMS (Yardstick MS)", a "legacy MS" or a "first type MS", and a BS to which the legacy technology is applied is referred to as an "YBS (Yardstick BS)", a legacy BS" or a "first type BS".

A system to which an advanced technology including the IEEE 802.16m standard (WirelessMAN-OFDMA Advanced System) is applied is referred to as a "new system" or a "second type system". An MS to which the advanced technology is applied is referred to as an "advanced MS (AMS)", a "new MS", or a "second type MS", and a BS to which the advanced technology is applied is referred to as an "advanced BS (ABS)", a "new BS" or a "first type BS".

It is assumed that an AMS accesses a YBS so as to receive a service from the YBS and an ABS (WirelessMAN-OFDMA Reference System/WirelessMAN-OFDMA Advanced co-existing system) supporting both an AMS and a YMS exists adjacent to the YBS.

The YBS has only a legacy zone (LZone) having a physical channel frame structure applied to a legacy system and the legacy zone refers to a zone supporting a legacy MS (YBS). It is assumed that an ABS has only a new MS support zone (MZone: 16M zone) having a physical channel frame structure applied to a new system if only an AMS is supported (WirelessMAN-OFDMA advanced system only). An ABS (WirelessMAN-OFDMA Reference System/WirelessMAN-OFDMA Advanced co-existing System legacy supportive) which supports both an AMS and an YMS has both a legacy zone (LZone) and a new MS support zone (MZone), which are divided in time units, for example, is divided using time division duplex (TDD) in frame units or subframe units, in uplink and downlink.

It is assumed that the AMS may receive services from both the ABS and the YBS. That is, it is assumed that the AMS may receive a service through any one of the new MS support zone and the legacy zone and may perform both a handover procedure defined in the legacy system and a handover procedure defined in the new system.

If the AMS performs handover to the ABS in a state of receiving a service from the YBS, the AMS may perform two handover procedures. If a target ABS supports a legacy zone (LZone), the ABS performs handover to an LZone of the target ABS through an IEEE 802.16e handover procedure and then completes the handover procedure through zone switching to MZone. If the target ABS does not support LZone, direct handover to an MZone may be performed.

Next, a capability negotiation method in a general IEEE 802.16e system will be described.

In an IEEE 802.16e network, capability negotiation between an MS and a BS is performed after initial ranging upon initial network entry. Capability negotiation between the MS and the BS is performed during initialization of the MS and is provided through subscriber station basic capability request/response (SBC-REQ/RSP) messages. An SBC-REQ message is a medium access control (MAC) message transmitted by the MS for basic capability negotiation with the BS, and an SBC-REQ message includes information about such capabilities, such as a modulation scheme and an encoding scheme supported by the MS.

DISCLOSURE

Technical Problem

An MS may perform handover from a YBS, which is a serving BS, to an ABS (WirelessMAN-OFDMA Reference System/WirelessMAN-OFDMA Advanced co-existing System), which supports both an AMS and an YMS, through zone switching.

In this case, since the MS and a target BS are not aware of mutual capabilities, capability negotiation is necessarily performed. When handover is performed between different networks for each BS, there is a need to perform new capability negotiation between the MS and the BS.

Technical Solution

The object of the present invention can be achieved by providing a method of performing handover from a first type serving base station (serving-YBS) to a second type target base station (target-ABS) by a mobile station (AMS), including transmitting to the second type target base station a ranging request (RNG-REQ) message including a field for requesting zone switching from a first type MS support zone (LZone) of the second type target base station to a second type MS support zone (MZone) through the first type MS support zone, receiving a ranging response (RNG-RSP) message including a field indicating omission of a capability negotiation (802.16m capability negotiation) message upon network re-entry from the second type target base station through the first type MS support zone, and transmitting a second type capability request (AAI_SBC-REQ) message to the second type target base station through the second type MS support zone.

The method may further include transmitting a bandwidth request message for the second type capability request message to the second type target base station through the second type MS support zone along with a bandwidth request (BR) code, and receiving uplink grant for the second type capability request (AAI_SBC-REQ) message from the second type target base station through the second type MS support zone as a response to the bandwidth request message.

The uplink grant for the second type capability request message may be received along with the bandwidth request code received by the second type target base station and a temporary station identifier (STID) allocated to the AMS, and the second type capability request message including the temporary STID may be transmitted.

The method may further include transmitting a bandwidth request (BR) code for a bandwidth request message to the second target base station through the second type MS support zone, receiving UL grant for the bandwidth request (BR) message from the second type target base station through the second type MS support zone, transmitting the bandwidth request message using uplink resources indicated by the uplink grant for the bandwidth request message, and receiving the uplink grant for the second type capability request message from the second type target base station through the second type MS support zone as a response to the bandwidth request message.

The uplink grant for the bandwidth request message may be received along with the bandwidth request code received by the second type target base station and a temporary station identifier (STID) allocated to the AMS, and the second type capability request message including the temporary STID may be transmitted.

The method may further include transmitting a connection identifier (LZONe's CID) and flow identifier (LZone's FID) used in communication with the second type target base station through the first type MS support zone by the AMS along with the bandwidth request message or the second type capability request message.

The transmitting the bandwidth request message further may include transmitting a base station identifier (BSID) and system information (SI) change count of a second type base station to the second type target base station through the second type MS support zone, if the AMS receives a service from the second type base station different from the second type target base station before receiving a service from the first type serving base station.

The ranging response message may include zone switching TLV, and the zone switching TLV may include the bandwidth request code dedicatedly allocated to the AMS.

The ranging response message may include zone switching TLV, and the zone switching TLV may include uplink grant for the second type capability request message and a temporary station identifier allocated to the AMS.

The field for requesting zone switching may be a ranging purpose indicator field in which a bit 4 is set to and the field indicating omission of the capability negotiation (802.16m capability negotiation) by the second type message may be a handover process optimization field in which a bit 14 is set to "1".

The method may further including receiving a second type capability response (AAI_SBC-RSP) message including a station identifier from the second type target base station through the second MS support zone, in response to the second type capability request message.

The capability negotiation message upon network re-entry may be at least one of a subscriber station basic capability request/response (SBC-REQ/RSP) message, a ranging request/response (RNG-REQ/RSP) message or a registration request/response (REG-REQ/RSP) message.

In another aspect of the present invention, there is provided a method of providing handover of a mobile station (AMS) from a first type serving base station (serving-YBS) to a second type target base station (target-ABS), including receiving a ranging request (RNG-REQ) message including a field for requesting zone switching from a first type MS support zone (LZone) of the second type target base station to a second type MS support zone (MZone) by the second type target base station through the first type MS support zone, transmitting a ranging response (RNG-RSP) message including a field indicating omission of a capability negotiation (802.16m capability negotiation) message upon network re-entry from the second type target base station to the AMS through the first type MS support zone, and receiving a second type capability request (AAI_SBC-REQ) message by the second type target base station through the second type MS support zone.

In another aspect of the present invention, there is provided a mobile station which performs handover from a first type serving base station (serving-YBS) to a second type target base station (target-ABS), including a processor, a reception module, a transmission module, and at least one antenna, wherein the processor transmits a ranging request (RNG-REQ) message including a field for requesting zone switching from a first type MS support zone (LZone) of the second type target base station to a second type MS support zone (MZone) through the first type MS support zone of the second type target base station, through the transmission module, receives a ranging response (RNG-RSP) message including a field indicating omission of a capability negotiation (802.16m capability negotiation) message upon network re-entry through the first type MS support zone of the second type target base station, through the reception module, and transmits a second type capability request (AAI_SBC-REQ) message through the second type MS support zone of the second type target base station, through the transmission module.

In another aspect of the present invention, there is provided a base station to which a mobile station performs handover from a first type serving base station (serving-YBS), including a processor, a reception module, a transmission module, and an antenna, wherein the processor receives a ranging request (RNG-REQ) message including a field for requesting zone switching from a first type MS support zone (LZone) of the base station to a second type MS support zone (MZone) through the first type MS support zone of the base station, through the reception module, transmits a ranging response (RNG-RSP) message including a field indicating omission of a capability negotiation (802.16m capability negotiation) message upon network re-entry through the first type MS support zone of the base station, through the transmission module, and receives a second type capability request (AAI_SBC-REQ) message through the second type MS support zone of the base station, through the reception module.

Advantageous Effects

According to the embodiments of the present invention, it is possible to provide a method of efficiently performing capability negotiation during handover through zone switching from a legacy serving base station to a new target base station by a new mobile station. In addition, it is possible to provide an efficient capability negotiation method during handover through zone switching without causing additional latency and network resource assignment problems.

The effects of the present invention are not limited to the above-described effects and other effects which are not described herein will become apparent to those skilled in the art from the following description.

DESCRIPTION OF DRAWINGS

FIG. 6 is a block diagram showing an example of the structure of a transmitter and a receiver according to another embodiment of the present invention.

BEST MODE

Figure 1:
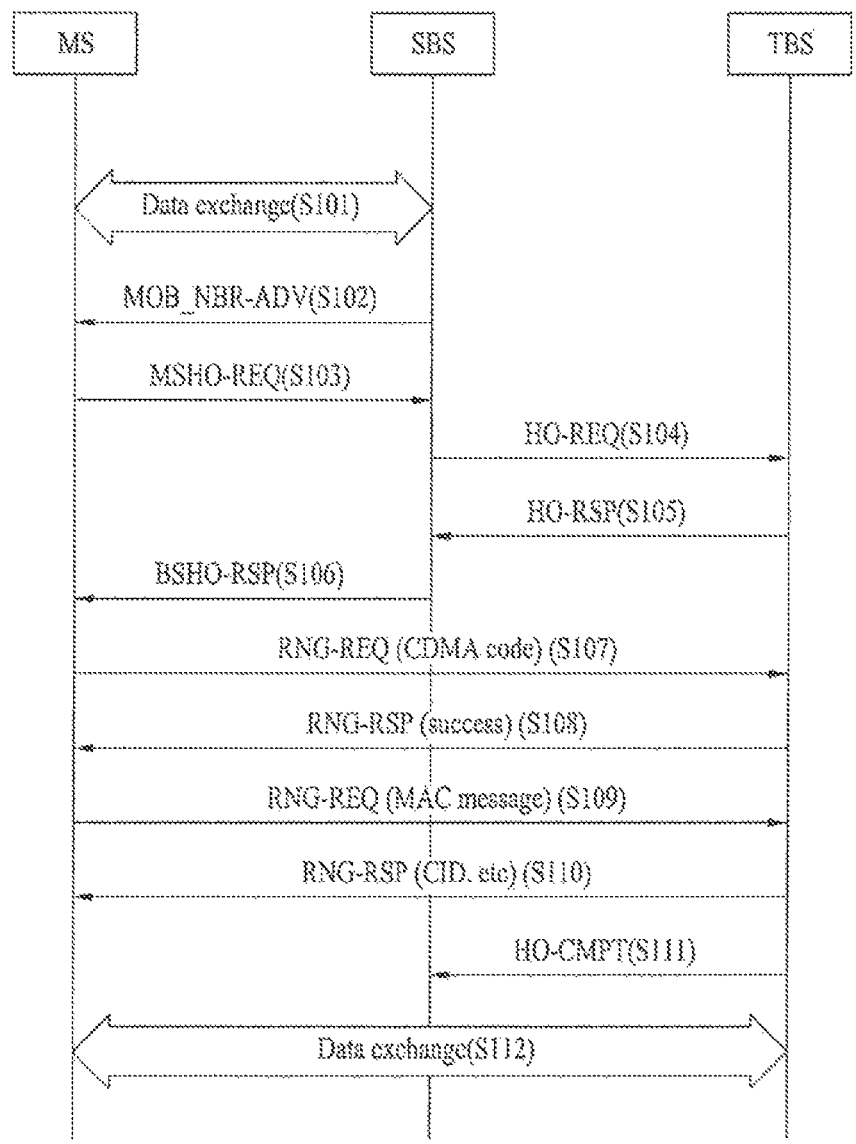
FIG. 1 is a diagram showing an example of a handover procedure which may be performed in an IEEE 802.16e system.

The following embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the mobile terminal.

Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with the terms fixed station, Node-B, eNode-B (eNB) or access point as necessary. The term "terminal" may also be replaced with the terms user equipment (UE), mobile station (MS), mobile subscriber station (MSS) or subscriber station (SS) as necessary.

The embodiments of the present invention may be implemented by various parts. For example, the embodiments of the present invention may be implemented by hardware, firmware, software or a combination thereof.

In the case of implementing the present invention by hardware, the present invention can be implemented via application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. For example, the software code may be stored in the memories so that it can be driven by the processors. The memory units are located inside or outside the processors, so that they can communicate with the aforementioned processors via a variety of well-known parts.

The embodiments of the present invention can be supported by the standard documents disclosed in any one of wireless access systems, such as an IEEE802 system, a $3^{rd}$ Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents. In addition, all the terms disclosed in the present document may be described by the above standard documents. In particular, the embodiments of the present invention may be supported by at least one of P802.16-2004, P802.16e-2005 and P802.16Rev2 documents, which are the standard documents of the IEEE802.16 system.

It should be noted that specific terms disclosed in the present invention are proposed for convenience of description and better understanding of the present invention, and the use of these specific terms may be changed to another format within the technical scope or spirit of the present invention.

Hereinafter, in the present specification, it is assumed that a legacy system or a first type system is an IEEE 802.16 system and a new system or a second type system is an IEEE 802.16m system.

Figure 2:
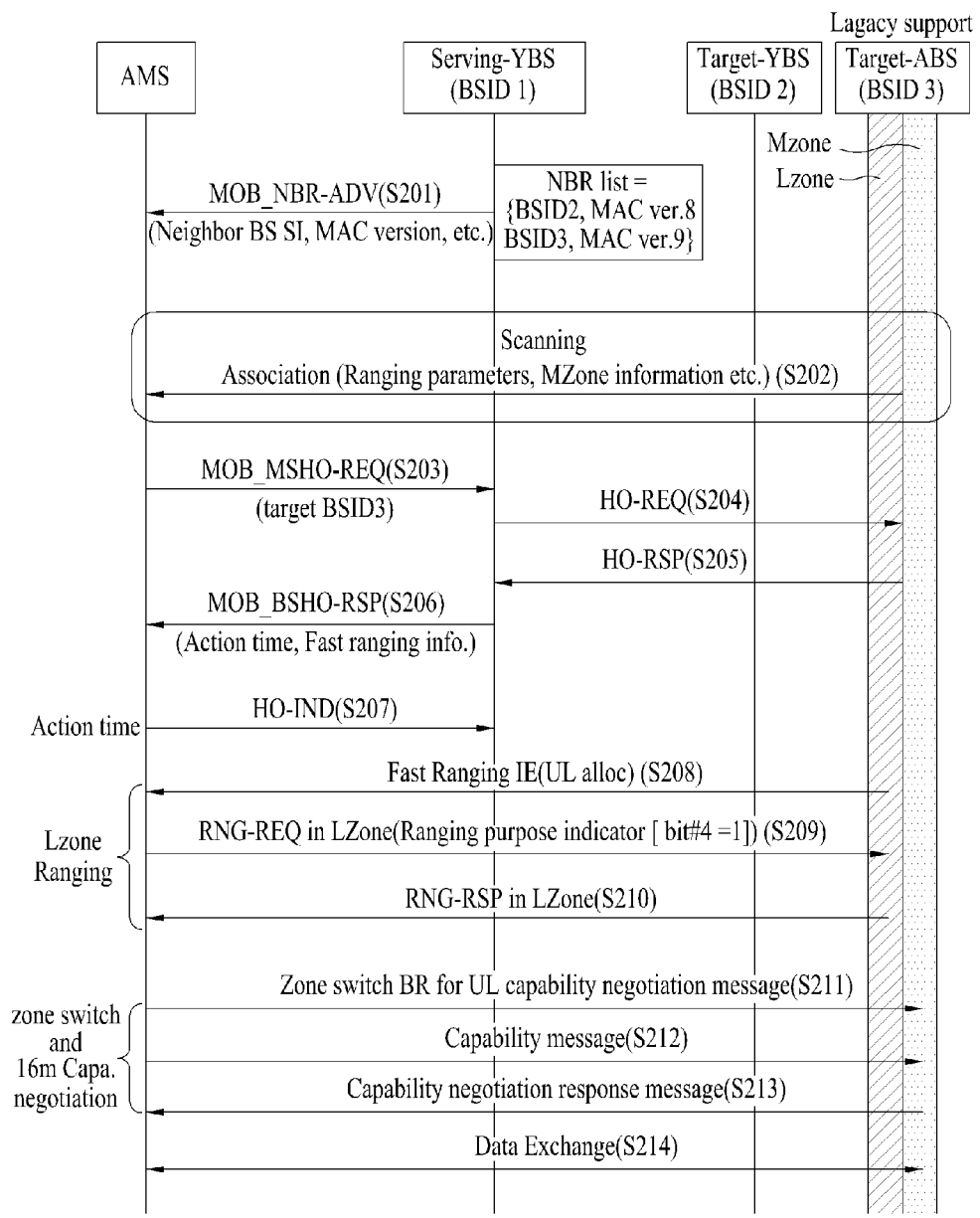
FIG. 2 is a diagram showing an example of a handover procedure using zone switching.

FIG. 2 is a diagram showing an example of a handover procedure through zone switching.

In FIG. 2, a fast ranging procedure is used. The fast ranging procedure refers to a procedure of omitting an uplink synchronization process by transmitting a CDMA ranging code and immediately transmitting a ranging request (RNG-REQ) message in order to selectively minimize handover latency in an IEEE 802.16 based wireless communication system.

Referring to FIG. 2, it is assumed that an AMS receives a service from a serving YBS (BSID 1), and another YBS (BSID 2) and an ABS (WirelessMAN-OFDMA Reference System/WirelessMAN-OFDMA Advanced co-existing System legacy supportive (BSID 3) supporting a legacy MS coexist adjacent to the serving YBS.

As described above, it is assumed that the YBS has only a legacy zone (LZone) and the ABS (BSID 3) supporting both the AMS and the YBS has both a legacy zone (LZone) and a new MS support zone (MZone).

First the serving YBS periodically broadcasts information about neighboring BSs located in a coverage area thereof through an MOB_NBR-ADV message, and the ABS receives this message and acquires the information about the neighboring BSs (S201).

The AMS may begin to scan candidate HO BSs using an HO trigger condition while communicating with the serving YBS (S202).

The AMS may transmit a handover request (MOB_MSHO-REQ) message and request the serving YBS to perform a handover procedure, if a handover condition exceeds, for example, a predetermined hysteresis margin value. At this time, the AMS may include a desired BS (here, BSID 3) in a handover request message (S203).

When the MOB_MSHO-REQ message is received, the serving YBS may inform the neighboring candidate HO BSs of the HO request from the AMS through an HO-REQ message (S204).

The candidate HO BSs may take precautions for the AMS which requests handover and transmit information associated with handover to the serving BS through an HO-RSP message (S205).

The serving YBS may transmit information associated with handover acquired from the candidate HO BSs through the HO-RSP message to the AMS through a handover response (MOB_BSHO-RSP) message. The MOB_BSHO-RSP message may include an action time field indicating a time when fast ranging information elements (Fast_Ranging_IE) of the candidate BSs will be transmitted to the AMS (S206).

The AMS which acquires the time when the fast ranging information elements is transmitted through the action time field may determine handover to the target ABS (BSID 3) and transmit a handover indication (HO-IND) message to the serving YBS (S207).

Next, the AMS may receive a fast ranging information element (Fast_Ranging_IE) from the target ABS (BSID 3) at a time indicated by the action time field and acquire uplink (UL) allocation information for transmitting a ranging request (RNG-REQ) message (S208).

The AMS transmits the ranging request (RNG-REQ) message to the legacy zone (LZone) of the ABS using uplink resources indicated by the received UL allocation information (S209).

At this time, the AMS may request zone switching form the ABS. Here, zone switching indicates that the AMS switches zones from the legacy zone (LZone) to new MS support zone (MZone) in order to receive a service from the new MS support zone (MZone).

In a method of informing the target BS of the request for zone switching by the AMS, a ranging purpose indication field of the ranging request message may be used.

Table 1 shows an example of the ranging purpose indication field according to the embodiments of the present invention.

TABLE 1

| Name | Type | Length | Value |
|---|---|---|---|
| Ranging Purpose indication | 6 | 1 | Bit 0: HO indication (May be combined with other information elements and, if set to "1", indicates that the MS attempts to reenter a network in a handover or idle mode.)<br>Bit 1: Location update request (If set to "1", indicates that a location update procedure is performed in an idle mode.)<br>Bit 2: Seamless HO indication (It may be combined with other information elements and, if set to "1", indicates that the MS starts ranging through a seamless handover procedure.)<br>Bit 3: Ranging Request for Emergency Call Setup (If set to "1", indicates an emergency call operation of the MS.)<br>Bit 4: HO indication of 802.16 m MS (AMS)<br>Bits 5-7: Reserved |

In the ranging purpose indication field used in the general legacy system, bit 4 may be changed as shown in Table 1. When the AMS transmits a ranging request message to the ABS, bit 4 is set to "1" such that the AMS requests a target ABS to perform handover through zone switching. If the target ABS receives the ranging request message in which bit 4 of the ranging purpose indication field is set to "1", the target ABS may recognize that the MS which transmits the ranging request message is an AMS, without additional information.

The AMS may further include MAC version information in the ranging request message, in order to inform the target ABS that the AMS is a new MS.

The target ABS (BSID 3) transmits a ranging response (RNG-RSP) message to the AMS as a response to the ranging request message (S210).

In a network re-entry procedure, the AMS and the ABS may perform capability negotiation (not shown). Capability negotiation upon network re-entry may be performed by a subscriber station basic capability request/response (SBC-REQ/RSP) message, a ranging request/response (RNG-REQ/RSP) message or a registration request/response (REG-REQ/RSP) message.

Then, the AMS enters the legacy zone (LZone) of the target ABS. Thereafter, the AMS requests a bandwidth for transmitting a capability negotiation request message from a new MS support zone, in order to perform zone switching to the new MS support zone of the target ABS (S211).

When the ABS allocates the requested bandwidth to the AMS, the AMS may transmit a request message for capability negotiation and the ABS may transmit a response message to the AMS so as to complete capability negotiation (S212, S213).

At this time, a new ranging request (Advanced Air Interface_Ranging-Request; AAI_RNG-REQ) may be used as the request message for capability negotiation and a new ranging response (Advanced Air Interfac_Ranging-response; AAI_RNG-RSP) message may be used as the response message. If capability negotiation is not performed in the step of exchanging the AAI_RNG-REQ/RSP message, capability negotiation may be performed by exchanging a new registration request (AAI_REG-REQ) message and a new registration response (AAI_REG-RSP) message.

Thereafter, the AMS may perform data exchange in the new MS support zone of the ABS (S214).

For bandwidth request (BR) in step S211 of the handover process, a step of allocating an STID through CDMA code ranging is further required. However, since the AMS completes synchronization or authentication in the legacy zone of the ABS, code ranging may cause unnecessary latency. Since CDMA code ranging is based on contention, if collision with CDMA code transmitted by another AMS occurs, additional latency occurs.

As described above, since the serving YBS and the target ABS are different in capabilities, upon network re-entry, capability negotiation may be performed by a basic capability request/response (SBC-REQ/RSP) message, a ranging request/response (RNG-REQ/RSP) message or a registration request/response (REG-REQ/RSP) message. However, if an MS performs handover to another BS after entering a network, as described above, system information of a target BS is acquired through DCD/UCD information of an MOB_NBR-ADV message of a serving BS and negotiation for a security procedure is performed for HO optimization during ranging with the target BS. Thus, negotiation does not necessarily need to be performed using an additional SBC-REQ/RSP message. If capabilities of the target BS are different from those of the serving BS, the target BS may inform the MSs of capability elements which should be additionally updated through the ranging response (RNG-RSP) message.

Capability negotiation of the legacy network (IEEE 802.16e network) may be performed by informing the MS of only capability elements different from those of the serving BS or sharing capabilities of the MS between the serving BS and the target BS. However, if handover is performed between heterogeneous networks (e.g., the IEEE 802.16e network and the IEEE 802.16m network), the MS and the target BS should negotiate for all capabilities. However, if the same core network (CN) is used even in the heterogeneous networks, authentication or registration does not need to be repeatedly performed. Accordingly, if repeated or unnecessary message exchange is omitted in capability negotiation, network burden resource allocation may be reduced.

Accordingly, the present invention proposes an efficient capability negotiation method during handover through zone switching without causing additional latency and network resource assignment problems.

The capability negotiation method during handover through zone switching according to the present invention may be largely divided into a method of performing handover through zone switching and capability negotiation with a bandwidth request and a method of assigning an uplink bandwidth in advance and performing handover through zone switching and capability negotiation without a bandwidth request.

A method of performing capability negotiation during handover through zone switching according to one embodiment of the present invention will be described with reference to FIGS. 3 to 5. Prior to the description of the method of performing handover through zone switching and capability negotiation shown in the drawings, common parts of FIGS. 3 to 5 will be described. Hereinafter, a description is given with reference to FIG. 3 for convenience of description, but is equally applicable to the common parts of FIGS. 4 and 5.

Figure 3:
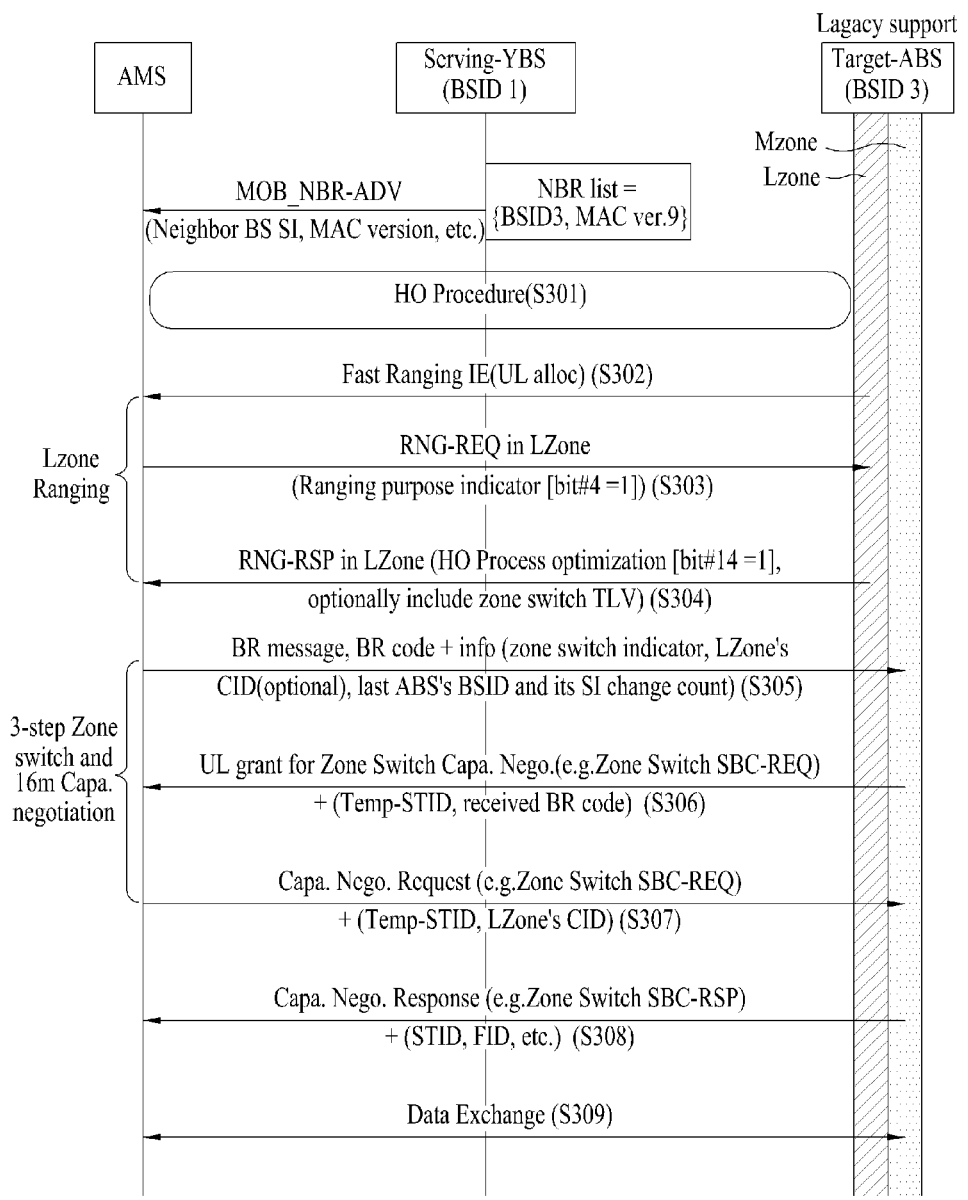
FIG. 3 is a diagram showing an example of a method of performing handover using zone switching and capability negotiation by an AMS through a non-contention bandwidth request procedure according to an embodiment of the present invention.

It is assumed that an ABS (WirelessMAN-OFDMA Reference System/WirelessMAN-OFDMA Advanced co-existing System, BSID 3) which exists adjacent to a serving YBS (BSID 1) shown in FIG. 3 and supports an YMS and an AMS exists. As described above, it is assumed that the YBS has only a legacy zone (LZone) and the ABS which supports the both the AMS and the YMS has both a legacy zone (LZone) and a new MS support zone (MZone).

The AMS may perform a handover procedure from the serving BS to the LZone of the ABS as a preparation step for zone switching (S301).

Here, the handover procedure refers to a process in which the AMS acquires information (MAC version information, an action time, etc.) about neighboring BSs from the serving YBS, determines whether or not handover to the target ABS (BSID 3) is performed, and transmits a handover indication (HO-IND) message to the serving YBS, similar to steps S201 to S207 of FIG. 2. The present procedure may include handover (MS-initiated HO) which is performed by an MS's request and handover (BS-initiated HO) which is performed by a serving BS's request. For clarity, a detailed description will be omitted.

Next, the AMS may receive a fast ranging information element (Fast_Ranging_IE) from the LZone of the target ABS (BSID 3) at a time indicated by an action time field and acquire uplink (UL) allocation information for transmitting a ranging request (RNG-REQ) message to the LZone (S302).

The AMS transmits the ranging request (RNG-REQ) message to the LZone of the ABS using uplink resources indicated by the received UL allocation information (S303).

At this time, the AMS may request the ABS to perform zone switching by setting bit 4 of the ranging purpose indication field to "1" in the ranging request message as described above. The ranging request message may include MAC version information of the AMS for informing the target ABS that the AMS is a new MS.

The target ABS may determine that the AMS requests zone switching by receiving the ranging request message and transmit a ranging response (RNG-RSP) message to the AMS (S304). The ranging response message may include zone switching TLV. Zone switching TLV may include a zone switching action time indicating a time when the AMS performs zone switching to a new MS support zone, etc.

After receiving the ranging response message (S304), the AMS may receive a superframe header (SFH) of the new MS support zone (MZone) and acquire synchronization and system information of the new MS support zone (MZone) (not shown).

If the AMS performs handover using zone switching form the serving YBS to the target ABS, since the AMS performs the legacy system (IEEE 802.16e) handover procedure from the service YBS to the target ABS through the LZone, the AMS may acquire the legacy system information of the target ABS through DCD/UCD information of an MOB_NBR-ADV message from the serving BS. In addition, since negotiation for a security procedure is performed for HO optimization during ranging with the target ABS, negotiation does not necessarily need to be performed through an additional SBC-REQ/RSP message. Capability negotiation of the legacy (IEEE 802.16e) system may be performed by informing the MS of capability elements differing from those of the serving BS or sharing capabilities of the MS between the serving BS and the target BS. Since the same core network (CN) is used, authentication or registration does not need to be repeatedly performed.

Accordingly, upon network re-entry, capability negotiation message exchange by a basic capability request/response (SBC-REQ/RSP) message, a ranging request/response (RNG-REQ/RSP) message or a registration request/response (REG-REQ/RSP) message may be omitted. However, for new system capabilities (802.16m capabilities), the AMS and the target ABS need to newly perform negotiation. At this time, registration may be omitted, similarly to general handover.

New system capabilities which should be shared between the AMS and the ABS are essential elements in an instant network re-entry or initial network entry procedure. Other capability functions may be negotiated after a secure connection between the MS and the BS is established (femto/relay capabilities, location based service capabilities, etc.).

A list of legacy capabilities (802.16e capabilities) which may be reused in new capabilities (802.16m capabilities) is as follows.
  Registration related information procedure (In the present invention, a registration procedure is included as a sub procedure of a capability negotiation procedure.)
  NSP (Network Service Provider) list
  Capabilities for construction and transmission of MAC PDU's
  Security negotiation parameters
  Visited NSP ID
  Authentication Type of EAP (Extensible Authentication Protocol)
  MIH (Media Independent HO) capability supported
  SDU MTU (Maximum Transfer Unit) capability
  Bandwidth allocation support
  HO trigger
  Association type support
  Service information query (SIQ) capability
  Visited NSP Realm
  SII-ADV (Service Identity Information-ADVertisement) Message pointer
  Extended capability
  Supported physical parameters
  Subscriber transition gaps
  Maximum Tx power (supported by SS(Subscriber Station))
  Current Tx power
  De/modulator types
  DL/UL FEC (Forward Error Correction) types
  UL power control support
  Permutation support
  AAS (Adaptive Antenna System) private MAP support
  CINR(Carrier-to-Interference Ration) measurement capability
  MAP capability
  MIMO (Multiple-Input Multiple-Output) support
  Pilot capability
  HARQ (Hybrid Automatic Repeat reQuest) incremental redundancy buffer capability
  HARQ chase combining capability
  OFDMA parameters set A list of new capabilities (802.16m capabilities) is as follows.
  Multi-carrier configuration
  Carrier aggregation
  Carrier decoding capability
  Frame structure
  MPDU (Message Protocol Data Unit) processing
  E-MBS (Enhanced-Multicast Broadcast Service)
  PHY capability
  SON(Self Organizing Network) capability
  Security
  Legacy support frame configuration As described above, if the AMS is aware of a part of new capabilities (e.g., 802.16e capabilities which may be reused in 802.16m capabilities), capability negotiation may cause unnecessary latency and resource waste. Accordingly, in order to efficiently perform capability negotiation during handover through zone switching, only necessary capability negotiation is performed. In this case, there is a need for setting information for disallowing capability negotiation (capability negotiation by SBC-REQ/RSP, RNG-REQ/RSP and REG-REQ/RSP) using the existing method upon zone switching. In order to set such information, an HO process optimization field included in the ranging response message of step S304 of FIG. 3 may be used.

Table 2 shows an example of an HO process optimization field according to the embodiments of the present invention.

TABLE 2

| Name | Type | Length | Value |
| --- | --- | --- | --- |
| HO Process Optimization | 21 | 2 | For each Bit location, a value of '0' indicates the associated re-entry management messages shall be required, a value of '1' indicates the re-entry management message should be omitted.<br>Bit 0: Omit SBC-REQ management messages during current re-entry processing<br>...<br>Bit 3: Omit Network Address Acquisition management messages during current re-entry processing<br>Bit 4: Omit Time of Day Acquisition management messages during current re-entry processing<br>Bit 5: Omit TFTP management messages during current re-entry processing<br>...<br>Bit 14: Perform 802.16 m Capability Negotiation<br>Bit 15: Reserved |

As shown in Table 2, if bit 4 of the HO process optimization field of the ranging response message from the LZone to the AMS is set to "1", this indicates that the MS omits a management message associated with capability negotiation upon network re-entry. Thus, upon network re-entry, capability negotiation by exchange of the SBC-REQ/RSP, RNG-REQ/RSP and REG-REQ/RSP message may be omitted. 802.16m capability negotiation necessary for data exchange between the AMS and the MZone of the target ABS may be performed by a new capability request/response (AAI_SBC-REQ/RSP) message of the embodiments of the present invention, which will be described below.

Figure 4:
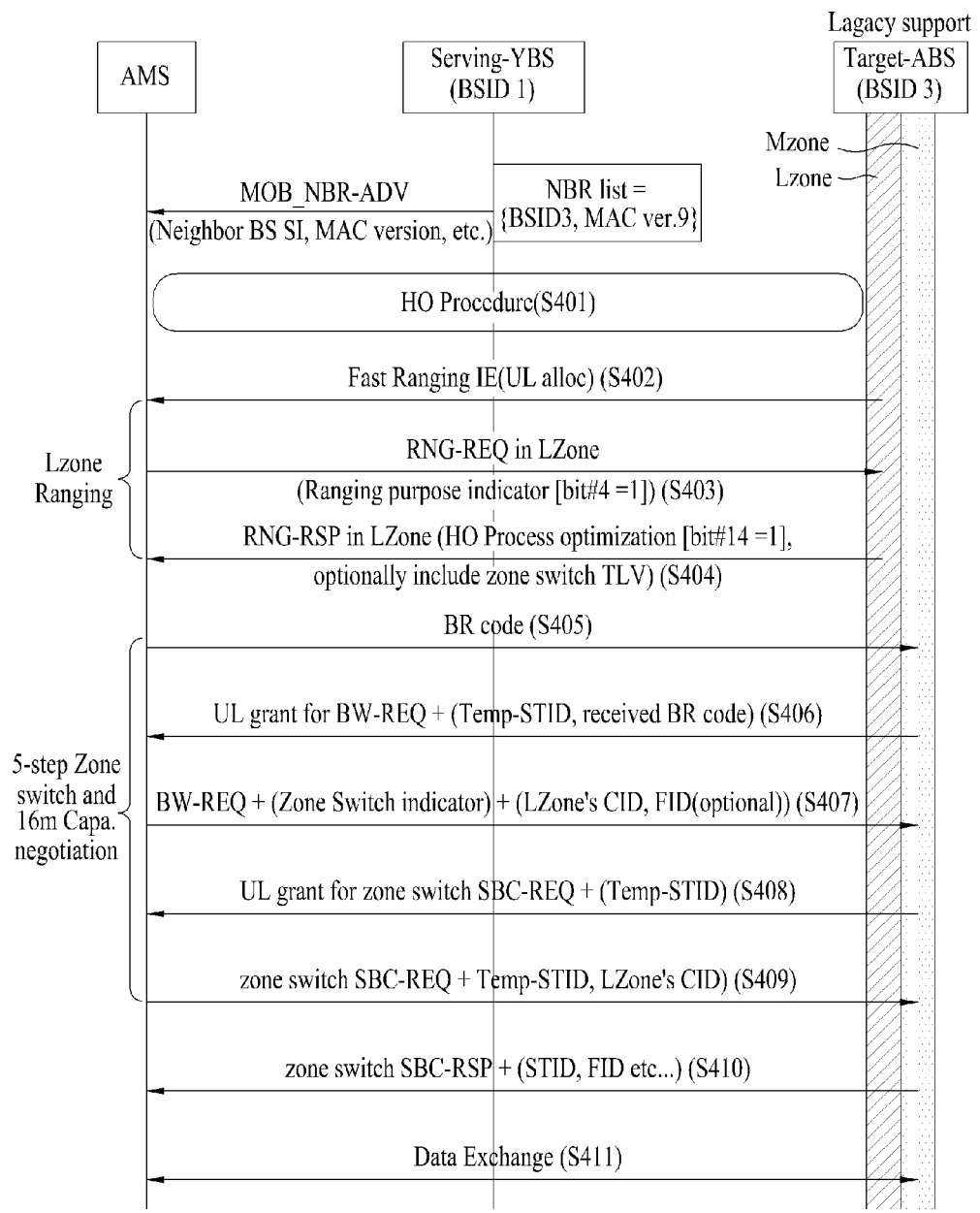
FIG. 4 is a diagram showing an example of a method of performing handover using zone switching and capability negotiation by an AMS through a contention bandwidth request procedure according to an embodiment of the present invention.
Figure 5:
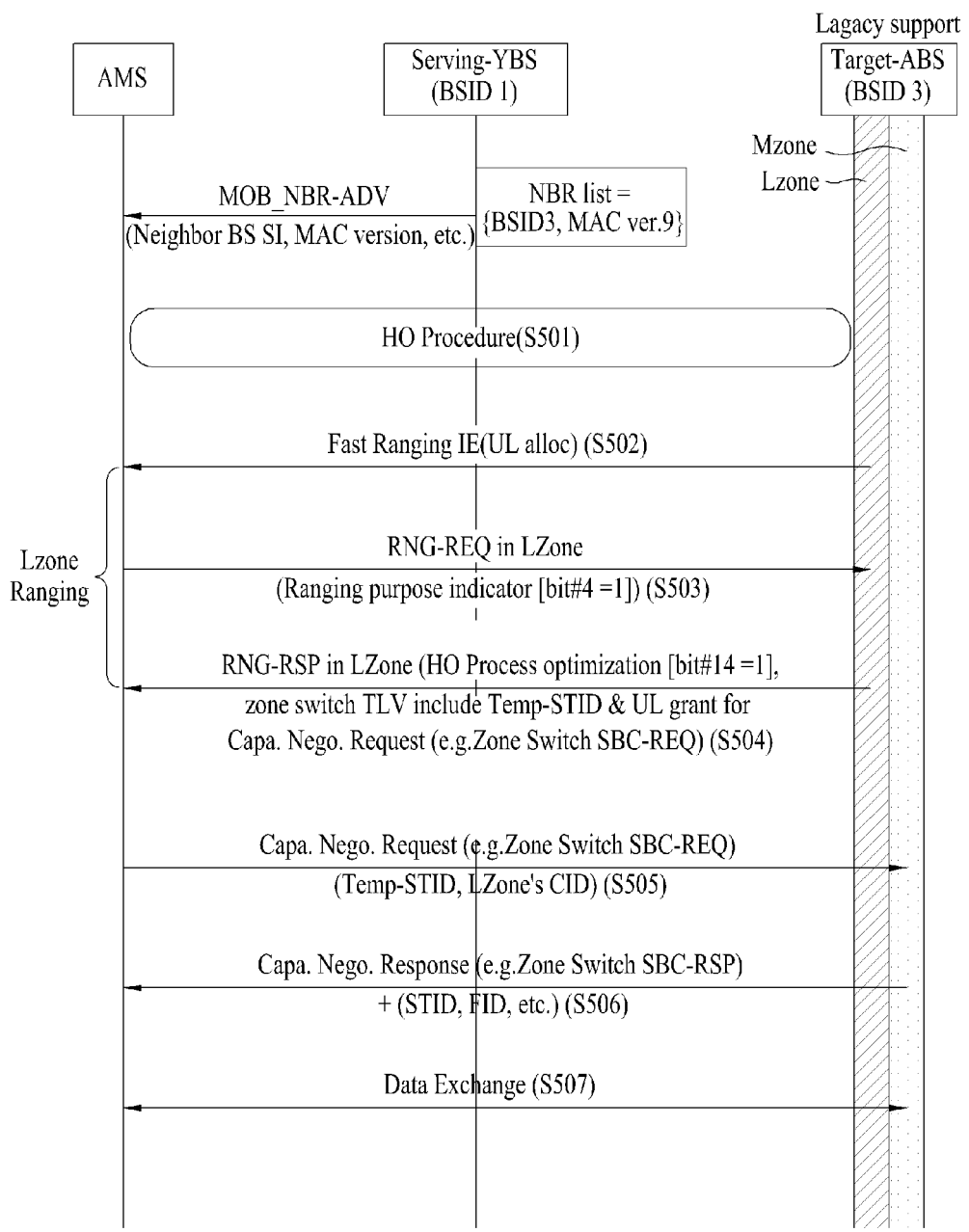
FIG. 5 is a diagram showing an example of a method of performing handover using zone switching and capability negotiation by an AMS without performing a bandwidth request procedure according to an embodiment of the present invention.

The common parts of FIGS. 3 to 5 have been described above. Although the AMS may re-enter the LZone of the ABS to perform data exchange after receiving the ranging response message (S304), in the present invention, a next procedure is performed without network re-entry. Hereinafter, the embodiments of the subsequent procedures will be described.

FIG. 3 is a diagram showing an example of a method of performing zone switching and capability negotiation by an AMS through a non-contention bandwidth request procedure according to an embodiment of the present invention. In the embodiment of the present invention shown in FIG. 3, a 3-step non-contention bandwidth request procedure is performed.

The description of steps S301 to S304 are equal to the description of the common part of FIGS. 3 to 5 and thus the characteristic parts of the present embodiment will now be described.

In step S304, a ranging response (RNG-RSP) message is received from the LZone of the target ABS. In the ranging response message, as described above, the bit 14 of the HO process optimization field is set to "1". In addition, the ranging response message may include zone switching TLV.

In step S305, the AMS may transmit a bandwidth request (BR) message to the MZone of the target ABS. The BR message may be transmitted to the MZone of the target ABS simultaneously with a BR code indicating zone switching. The BR code may be dedicatedly allocated to the AMS in advance through zone switching TLV which may be included in the ranging response message (S304).

The BR message (S305) may be transmitted along with reason and additional information of the BR. The reason of the BR may be a zone switching indicator indicating zone switching in the present embodiment. In association with zone switching from the LZone to the MZone, the target ABS can recognize that zone switching is necessary by bit 4 which is set to "1" when the MAC version or the ranging request message of the AMS which is included in the RNG-REQ message (S303) is transmitted to the ABS. Thus, the target ABS may include zone switching TLV in the RNG-RSP message and transmit the RNG-RSP message (S304) and the AMS may recognize zone switching to the MZone through zone switching TLV.

If possible, additional information may include a connection identifier (CID) which was used by the AMS in the LZone (if the CID transmission of step S305 is not possible, the CID may be transmitted to the MZone of the target ABS in step S307). The AMS may provide the identity of the AMS to the ABS through the CID.

Additionally, if the AMS receives a service from an ABS (e.g., BSID 4, not shown) different from the target ABS (BSID 3) before receiving a service from the serving YBS (BSID 1), the additional information may include a BS identifier (BSID 4) of the ABS (BSID 4) and system information (SI) change count. The target ABS (BSID 3) which receives such additional information may compare system information corresponding to the change count of the ABS (BSID 4), from which the AMS receives the service, with the system information of the ABS (BSID 3). System information which is determined to be updated as the compared result is included in the below-described new capability response (AAI_SBC-RSP; S308) and is provided to the AMS, thereby reducing the amount of capability response information. Thus, it is possible to reduce overhead.

In step S306, the target ABS may transmit UL grant to the AMS through the MZone in response to the BR message. Here, if the BR code is allocated to the AMS through zone switching TLV in advance in step S304, the bandwidth request procedure is a non-contention procedure. According to the non-contention procedure, when the target ABS receives the BR code and the BR message of the AMS (S305), UL grant (for AAI_SBC-REQ) including UL resource allocation information for transmitting a new capability request (AAI_SBC-REQ) message may be transmitted to the AMS through the MZone (S306).

Additionally, the target ABS may transmit to the AMS a temporary station identifier (STID) allocated to the AMS along with UL grant. The temporary STID is used to identify the AMS in the MZone before an STID is allocated to the AMS and is released or discarded after the STID is allocated.

The target ABS may transmit UL grant to the AMS and, at the same time, transmit a BR code received from the AMS in step S305. Since the BR code is dedicatedly allocated to the AMS in advance by the target ABS through zone switching TLV as described above, the AMS may confirm that UL grant is for the AMS using the BR code.

In step S307, the AMS may transmit a new capability request (AAI_SBC-REQ) message for requesting information about capabilities supported by the AMS and the capabilities of the target ABS through the uplink resources allocated in step S306 to the MZone of the target ABS. The new capability request (AAI_SBC-REQ) message is a MAC management message for enabling the AMS to acquire the new capabilities (802.16m capabilities) necessary for data exchange in the MZone of the target ABS. Detailed examples of such new capabilities are equal to the list described in the common part of the embodiments of the present invention.

Additionally, the AMS may transmit a connection identifier (CID) and flow identifier (FID) which were used by the AMS in the LZone to the MZone of the target ABS along with the new capability request message. The AMS may be identified in the MZone of the target ABS, by the CID and FID which were used by the AMS in the LZone of the target ABS. The ABS may easily perform mapping of the STID and the FID allocated to the AMS in the MZone using the CID and FID which were used by the AMS in the LZone.

In step S308, the target ABS may transmit a new capability response (AAI_SBC-RSP) message to the AMS through the MZone in response to the new capability request (AAI_SBC-REQ) message. The target ABS may determine whether such capabilities can be supported, in consideration of the capability information of the AMS included in the new capability request message received in step S307. The new capability response message may include information about the determined result.

The target ABS may identify the AMS using the CID or FID which was used by the AMS in the LZone, which is received from the AMS in step S305 or S307, generate the STID for identifying the AMS in the MZone of the target ABS, and perform mapping of a new FID. The target ABS may transmit the generated STID and FID to the AMS along with the new capability response message through the MZone. Such an STID may be fixedly used in the subsequent procedure between the AMS and the MZone of the ABS.

In step S309, capability negotiation between the AMS and the MZone of the target ABS may be completed so as to continuously perform information exchange which has been performed between the AMS and the LZone of the target ABS.

According to one embodiment of the present invention, since the AMS already completes synchronization or authentication in the LZone of the target ABS, necessity for performing CDMA code ranging for bandwidth request to the MZone of the target ABS is eliminated and the procedure of exchanging the subscriber station basic capability request/response (SBC-REQ/RSP) message, the ranging request/response (RNG-REQ/RSP) message or the registration request/response (REG-REQ/RSP) message upon network re-entry may be omitted. Accordingly, it is possible to prevent additional latency and unnecessary resource use and to perform capability negotiation during handover through zone switching using a simple and efficient method.

FIG. 4 is a diagram showing an example of a method of performing zone switching and capability negotiation by an AMS through a bandwidth request procedure according to an embodiment of the present invention. In the embodiment of the present invention shown in FIG. 4, a 5-step contention bandwidth request procedure is performed, which is different from the embodiment of FIG. 3 in which the 3-step non-contention bandwidth request procedure is performed.

In the embodiment of the present invention shown in FIG. 4, steps S401 to S404 are similar to steps S301 to S304 of FIG. 3 and a description thereof will be omitted. The description of the parts of subsequent steps S405 to S409 equal to those of steps S305 to S309 of FIG. 3 will be omitted for clarity and the characteristic parts of the present embodiment will be described below.

In step S405, the AMS may transmit only a BR code to the MZone of the ABS in order to acquire UL grant (for BW-REQ) for transmitting the bandwidth request (BW-REQ) message to the MZone of the target ABS. The BW code is not allocated to the AMS in advance. The AMS may select any one of a set of BW codes and transmit the selected BW code to the MZone of the target ABS.

In step S406, the target ABS may transmit UL grant (for BW-REQ) including UL resource allocation information for transmitting the bandwidth request (BW-REQ) message for the MZone to the AMS along with the BW code according to the contention bandwidth request procedure, if collision with the BW code transmitted from another AMS does not occur. Additionally, the target ABS may transmit to the AMS a temporary STID allocated to the AMS along with UL grant.

In step S407, the AMS may transmit a bandwidth request (BW-REQ) message to the MZone of the target ABS through UL resources allocated in step S406. The bandwidth request message may be transmitted along with the reason (zone switching indicator) of the bandwidth request and additional information (CID and FID which were used by the AMS in the LZone).

In step S408, the target ABS may transmit UL grant (for AAI_SBC-REQ) including UL resource allocation information for transmitting a new capability request (AAI_SBC-REQ) message to the AMS through the MZone in response to the bandwidth request message. Additionally, the target ABS may transmit to the AMS a temporary STID allocated to the AMS along with UL grant.

In step S409, the AMS may transmit the new capability request (AAI_SBC-REQ) message for requesting the capabilities of the target ABS and information about the capabilities which can be supported by the AMS to the MZone of the target ABS through UL resources allocated in step S408. Additionally, the AMS may transmit the CID and FID which were used by the AMS in the LZone to the MZone of the target ABS along with the new capability request message.

The example of the method of performing zone switching and capability negotiation through the 5-step bandwidth request procedure is described above. The subsequent steps S410 and S411 are similar to steps S308 and S309 of FIG. 3 and a description thereof will be omitted.

According to one embodiment of the present invention, the AMS may perform zone switching and capability negotiation without allocation of the bandwidth request code through the zone switching TLV of the ranging response message (S404). Accordingly, it is possible to prevent additional latency and unnecessary resource usage and to perform capability negotiation during handover through zone switching using a simple and efficient method.

FIG. 5 is a diagram showing an example of a method of performing capability negotiation by an AMS without performing a bandwidth request procedure according to an embodiment of the present invention.

In the embodiment of the present invention shown in FIG. 5, steps S501 to S503 are similar to steps S301 to S303 of FIG. 3 and a description thereof will be omitted. The description of the parts of subsequent steps S504 to S507 equal to those of steps S304 to S309 of FIG. 3 will be omitted for clarity and the characteristic parts of the present embodiment will be described below.

In step S504, a ranging response (RNG-RSP) message is received from the LZone of the target ABS. In the ranging response message, as described above, the bit 14 of the HO process optimization field is set to "1". In addition, the ranging response message may include zone switching TLV.

The zone switching TLV may include an STID or a temporary STID allocated to the AMS. The zone switching information may include UL grant for the MZone of the target ABS. UL grant is used to allocate UL resources for transmitting the new capability negotiation request (AAI_SBC-REQ) message.

In step S504, since UL grant is received in advance through zone switching information, the AMS may transmit a new capability negotiation request (AAI_SBC-REQ) message to the MZone of the target ABS through the allocated UL resources, without transmitting a bandwidth request code/message to the ABS.

The new capability request/response and data exchange procedure of steps S505 to S507 are similar to the new capability request/response and data exchange procedure of steps S307 to S309 of FIG. 3 and thus a description thereof will be omitted.

According to one embodiment of the present invention, the AMS can perform zone switching and capability negotiation, without performing a bandwidth request procedure. Accordingly, it is possible to prevent additional latency and unnecessary resource usage and to perform capability negotiation during handover through zone switching using a simple and efficient method.

As another embodiment of the present invention, an MS and a BS in which the embodiments of the present invention described with reference to FIGS. 3 to 5 may be performed will be described with reference to FIG. 6.

The MS operates as a transmitter in uplink and operates as a receiver in downlink. The BS may operate as a receiver in uplink and operate as a transmitter in downlink. That is, each of the MS and the BS may include a transmitter and a receiver for transmission of information or data.

The transmitter and the receiver may include a processor, a module, a portion and/or means for performing the embodiments of the present invention. In particular, the transmitter and the receiver may include a module (means) for encrypting a message, a module for decrypting an encrypted message, and an antenna for transmitting or receiving a message. An example of the transmitter and the receiver will be described with reference to FIG. 6.

Referring to FIG. 6, a left side shows the structure of the transmitter and a right side shows the structure of the receiver. The transmitter and the receiver may include antennas 600 and 610, processors 620 and 630, transmission (Tx) modules 640 and 650, reception (Rx) modules 660 and 670, and memories 680 and 690, respectively. These components may perform corresponding functions. Hereinafter, the components will be described in more detail.

The antennas 600 and 610 serve to transmit signals generated by the Tx modules 640 and 650 and receive external radio signals to the Rx modules 660 and 670. The number of antennas may be two or more if a Multi-Input Multi-Output (MIMO) function is supported.

The processors 620 and 630 generally control the overall operations of the transmitter and the receiver. In particular, a controller function for performing the above-described embodiments of the present invention, a MAC frame variable control function according to service characteristics and transmission environment, a handover function and an authentication and encryption function may be performed.

For example, when the steps of the above-described zone switching methods are performed, the processor of the MS may determine information to be included in an MAC message, such as a ranging request message, a bandwidth request message or a capability request message, generate a message, and control the Tx module 650 to transmit the message to the BS at an appropriate time. The processor 630 may control the Rx module 670 to analyze information included in the MAC message, such as a ranging response message, uplink grant or a capability response message transmitted from the BS, and determine and perform an adequate action corresponding thereto.

Meanwhile, the processor of the BS may analyze the MAC message or data transmitted from the MS, allocate UL resources necessary for the MS, generate UL grant, etc. for informing the MS of allocation information, and perform scheduling for transmitting UL grant. The processor of the BS may allocate identifiers such as a temporary STID, an STID or an FID requested by the MS and generate and transmit a MAC message including the information to the MS.

The Tx modules 640 and 650 may be scheduled by the processors 620 and 630 so as to perform predetermined coding and modulation with respect to data to be transmitted and to send the data to the antennas 600 and 610.

The Rx modules 660 and 670 may perform decoding and demodulation of the radio signals received through the antennas 600 and 610 and restore and send original data to the processors 620 and 630.

The memories 680 and 690 may store programs for processing and controlling the processors 620 and 630 and perform a function for temporarily storing input/output data (in the case of the MS, uplink (UL) grant allocated by the BS, system information, STID, FID, capability information, etc.). In addition, the memories 680 and 690 may include at least one of storage mediums such as a flash memory type, hard disk type, multimedia card micro type and card type memory (e.g., an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disc.

Meanwhile, the BS may perform a controller function for performing the above-described embodiments of the present invention, Orthogonal Frequency Division Multiple Access (OFDMA) packet scheduling, Time Division Duplex (TDD) packet scheduling and a channel multiplexing function, an MAC frame variable control function according to service characteristics and transmission environment, a high-speed traffic real-time control function, a handover function, an authentication and encryption function, a packet modulation/demodulation function for data transmission, a high-speed packet channel coding function and a real-time modem control function using at least one of the above-described modules, or further include separate means, modules or portions for performing such functions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The method and apparatus for performing handover through zone switching according to the embodiments of the present invention are applicable to mobile communication systems or the wireless communication industry.

The invention claimed is:
1. A method of performing handover from a first type serving base station to a second type target base station by a mobile station (MS), the method comprising:
performing, by the MS, a network entry to the first type serving base station;

transmitting, after the network entry to the first type serving base station, a ranging request (RNG-REQ) message to the second type target base station through a first type MS support zone, the RNG-REQ message including a field for requesting zone switching from the first type MS support zone of the second type target base station to a second type MS support zone of the second type target base station;

receiving a ranging response (RNG-RSP) message from the second type target base station through the first type MS support zone, the RNG-RSP message including a field indicating omission of a first type capability negotiation message for a network re-entry to the second type target base station; and transmitting a second type capability request message to the second type target base station through the second type MS support zone, wherein an authentication procedure is not performed during the network re-entry to the second type target base station, and if uplink grant is not included in the RNG-RSP message, performing a bandwidth request (BR) procedure or a second BR procedure, wherein the first BR procedure includes:
transmitting a BR code for a BR message to the second target base station through the second type MS support zone;
receiving uplink grant for the BR message from the second type target base station through the second type MS support zone;
transmitting the BR message using uplink resources indicated by the uplink grant for the BR message; and
receiving the uplink grant for the second type capability request message from the second type target base station through the second type MS support zone as a response to the BR message; and wherein the second BR procedure includes:
transmitting a BR message for the second type capability request message to the second type target base station through the second type MS support zone along with a BR code; and
receiving uplink grant for the second type capability request message from the second type target base station through the second type MS support zone as a response to the BR message.

2. The method according to claim 1, wherein if the second BR procedure is performed:
the uplink grant for the second type capability request message is received along with the BR code received by the second type target base station and a temporary station identifier (STID) allocated to the MS, and
the second type capability request message including the temporary STID is transmitted.

3. The method according to claim 1, wherein if the first BR procedure is performed:
the uplink grant for the BR message is received along with the BR code received by the second type target base station and a temporary station identifier (STID) allocated to the MS, and
the second type capability request message including the temporary STID is transmitted.

4. The method according to claim 1, further comprising transmitting a connection identifier and flow identifier used in communication with the second type target base station through the first type MS support zone by the MS along with the BR message or the second type capability request message.

5. The method according to claim 1, wherein transmitting the BR message includes transmitting a base station identifier (BSID) and system information (SI) change count of a second type base station to the second type target base station through the second type MS support zone, if the MS receives a service from the second type base station differing from the second type target base station before receiving a service from the first type serving base station.

6. The method according to claim 1, wherein:
the RNG-RSP message includes zone switching TLV, and
the zone switching TLV includes the BR code dedicatedly allocated to the MS.

7. The method according to claim 1, wherein:
the field for requesting zone switching is a ranging purpose indicator field in which a bit 4 is set to "1", and
the field indicating omission of the first type capability negotiation is a handover process optimization field in which a bit 14 is set to "1".

8. The method according to claim 1, further including receiving a second type capability response message including a station identifier from the second type target base station through the second MS support zone, in response to the second type capability request message.

9. The method according to claim 1, wherein the first type capability negotiation message for the network re-entry to the second type target base station is at least a subscriber station basic capability request/response (SBC-REQ/RSP) message, a ranging request/response (RNG-REQ/RSP) message or a registration request/response (REG-REQ/RSP) message.

10. The method according to claim 1,
wherein the first type indicates a type supporting IEEE 802.16e system, and
wherein the second type indicates a type supporting IEEE 802.16m system.

11. The method according to claim 1, wherein if the RNG-RSP message includes the uplink grant for the second type capability request message, the RNG-RSP includes zone switching Type-Length-Value (TLV) which includes the uplink grant and a temporary station identifier allocated to the MS.

12. A method of providing handover of a mobile station (MS) from a first type serving base station to a second type target base station, the method comprising:
receiving, after a network entry of the MS to the first type serving base station is performed, a ranging request (RNG-REQ) message from the MS by the second type target base station through a first type MS support zone, the RNG-REQ message including a field for requesting zone switching from the first type MS support zone of the second type target base station to a second type MS support zone of the second type target base station;
transmitting, by the second type target base station, a ranging response (RNG-RSP) message to the MS through the first type MS support zone, the RNG-RSP message including a field indicating omission of a first type capability negotiation message for a network re-entry to the second type target base station; and
receiving, by the second type target base station, a second type capability request message from the MS through the second type MS support zone,
wherein an authentication procedure is not performed during the network re-entry to the second type target base station, and
if uplink grant is not included in the RNG-RSP message, performing a first bandwidth request (BR) procedure or a second BR procedure, wherein the first BR procedure includes:
    receiving a BR code for a BR message by the second target base station from the MS through the second type MS support zone;
    transmitting uplink grant for the BR message by the second type target base station from the MS through the second type MS support zone;
    receiving the BR message by the second type target base station from the MS using uplink resources indicated by the uplink grant for the BR message; and
    transmitting the uplink grant for the second type capability request message by the second type target base station to the MS through the second type MS support zone as a response to the BR message; and
wherein the second BR procedure includes:
    transmitting a BR message for the second type capability request message to the second type target base station through the second type MS support zone along with a BR code; and
    receiving uplink grant for the second type capability request message from the second type target base station through the second type MS support zone as a response to the BR message.

13. The method according to claim 12, wherein if the RNG-RSP message includes the uplink grant for the second type capability request message, the RNG-RSP includes zone switching Type-Length-Value (TLV) which includes the uplink grant and a temporary station identifier allocated to the MS.

14. A mobile station (MS) which performs handover from a first type serving base station to a second type target base station, the MS comprising:
    a processor;
    a reception module;
    a transmission module; and
    at least one antenna,
    wherein the processor is configured to:
    perform a network entry to the first type serving base station;
    transmit, after the network entry to the first type serving base station, a ranging request (RNG-REQ) message to the second type target base station through a first type MS support zone, the RNG-REQ message including a field for requesting zone switching from the first type MS support zone of the second type target base station to a second type MS support zone, through the transmission module;
    receive a ranging response (RNG-RSP) message from the second type target base station through the first type MS support zone, the RNG-RSP message including a field indicating omission of a first type capability negotiation message for a network re-entry to the second type target base station, through the reception module; and
    transmit a second type capability request message to the second type target base station through the second type MS support zone, through the transmission module,
    wherein an authentication procedure is not performed during the network re-entry to the second type target base station, and
    wherein a first bandwidth request (BR) procedure or a second BR procedure is performed if uplink grant is not included in the RNG-RSP message,
    wherein to perform the first BR procedure the processor is further configured to:
    transmit a BR code for a BR message to the second target base station through the second type MS support zone, through the transmission module;
    receive uplink grant for the BR message from the second type target base station through the second type MS support zone, through the reception module;
    transmit the BR message using uplink resources indicated by the uplink grant for the BR message, to the second target base station through the transmission module; and
    receive the uplink grant for the second type capability request message from the second type target base station through the second type MS support zone as a response to the BR message, through the reception module; and
wherein to perform the second BR procedure the processor is further configured to:
    transmit a BR message for the second type capability request message to the second type target base station through the second type MS support zone along with a BR code, through the transmission module; and
    receive the uplink grant for the second type capability request message from the second type target base station through the second type MS support zone as a response to the BR message, through the reception module.

15. The mobile station according to claim 14, wherein if the RNG-RSP message includes the uplink grant for the second type capability request message, the RNG-RSP includes zone switching Type-Length-Value (TLV) which includes the uplink grant and a temporary station identifier allocated to the MS.

16. A second type target base station to which handover of a mobile station (MS) from a first type serving base station is performed, the second type target base station comprising:
    a processor;
    a reception module;
    a transmission module; and
    an antenna,
    wherein the processor is configured to:
    receive, after a network entry of the MS to the first type serving base station is performed, a ranging request (RNG-REQ) message from the MS through a first type MS support zone, the RNG-REQ message including a field for requesting zone switching from the first type MS support zone of the second type target base station to a second type MS support zone of the second type target base station, through the reception module;
    transmit a ranging response (RNG-RSP) message to the MS through the first type MS support zone, the RNG-RSP message including a field indicating omission of a first type capability negotiation message for a network re-entry to the second type target base station, through the transmission module; and
    receive a second type capability request message from the MS through the second type MS support zone, through the reception module,
    wherein an authentication procedure is not performed during the network re-entry to the second type target base station, and
    wherein a first bandwidth request (BR) procedure or a second BR procedure is performed if uplink grant is not included in the RNG-RSP message,
    wherein to perform the first BR procedure the processor is further configured to:
    receive a BR code for a BR message from the MS through the second type MS support zone, through the reception module;

transmit uplink grant for the BR message from the MS through the second type MS support zone, through the transmission module;

receive the BR message from the MS using uplink resources indicated by the uplink grant for the BR message, through the reception module; and transmit the uplink grant for the second type capability request message to the MS through the second type MS support zone as a response to the BR message, through the transmission module; and wherein to perform the second BR procedure the processor is further configured to:

transmit a BR message for the second type capability request message to the second type target base station through the second type MS support zone along with a BR code, through the transmission module; and receive the uplink grant for the second type capability request message from the second type target base station through the second type MS support zone as a response to the BR message, through the reception module.

17. The second type target base station according to claim 16, wherein if the RNG-RSP message includes the uplink grant for the second type capability request message, the RNG-RSP includes zone switching Type-Length-Value (TLV) which includes the uplink grant and a temporary station identifier allocated to the MS.

\* \* \* \* \*